Nov. 20, 1951     A. SANTA     2,575,731
ELASTIC FASTENING MEANS FOR SPECTACLE LENSES
Filed Aug. 25, 1948
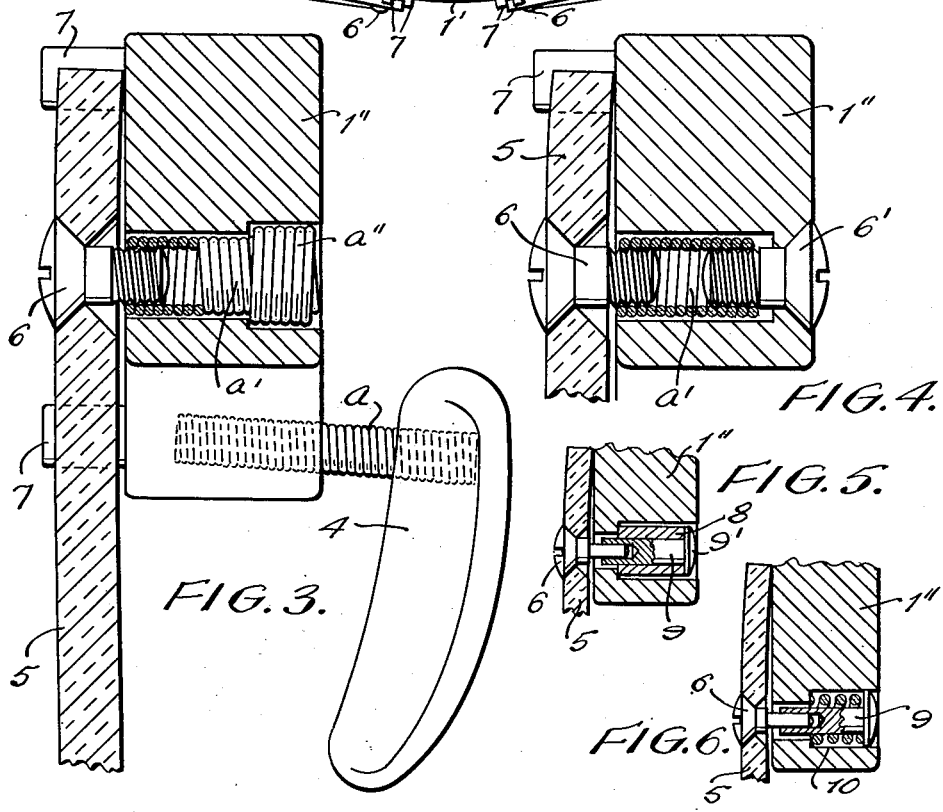
INVENTOR.
Antonio Santa
BY Michael S. Striker
agt.

Patented Nov. 20, 1951

2,575,731

UNITED STATES PATENT OFFICE 2,575,731

ELASTIC FASTENING MEANS FOR SPECTACLE LENSES

Antonio Santa, Turin, Italy

Application August 25, 1948, Serial No. 45,986
In Italy June 12, 1948

5 Claims. (Cl. 88—47)

The present invention has for its object the elastic fastening of spectacle-frame elements to the spectacle-frame, in particular of the lenses or glasses and the nasal supports. The fastening means for every element is a resilient member elastically secured at one end to the frame and at the other end to the element to be fastened. Since every fastening member is resilient the elements connected to the frame have a certain freedom of movement. This results in greater comfort in use and a better adaptation to the wearer's features, while the elastic deformability of the structure makes the spectacles less subject to breaking.

Some embodiments of the present invention are shown, by way of example only, on the accompanying drawing in which Fig. 1 is a front elevation of a preferred embodiment of the present invention;

Fig. 2 is a plan view of the embodiment shown in Fig. 1;

Fig. 3 is an enlarged vertical cross-sectional view on line 3—3 of Fig. 1;

Fig. 4 is an enlarged vertical cross-sectional view of a resilient connection according to another embodiment of the present invention;

Fig. 5 is an enlarged cross-section view of a resilient connection according to a further embodiment; and Fig. 6 is an enlarged cross-sectional view of a resilient connection according to a still further embodiment.

In the embodiment shown in Figs. 1 and 2, the frame consists only of the slightly arched beam 1, at the ends of which the bows 3 are linked by hinges 2, while its central portion 1' resting on the nose has the form of an arched bridge. The beam 1 shows at the ends of bridge 1' two oblique projections 1" to which nasal supports 4 and glasses 5 are secured. The frame is preferably made of a plastic material and may be provided internally with wire reinforcements. The nasal supports 4, also made of a plastic material, are each anchored on the frame by means of a short helical spring $a$ of very closely coiled steel wire, with its ends imbedded in, or anchored on the support 4 and the corresponding projection 1" of the frame in respect to which the spring portion $a$ is arranged at a substantially right angle. Such an arrangement allows a resilient displacement of the supports 4 in any direction and hence resilient accommodation of same to the nose whatever the shape of the nose may be.

According to the embodiment shown in Figs. 1 to 3, each lens 5 is fastened at one point only, to the frame by means of a short length of helical spring $a'$ made of very closely coiled steel wire. This spring $a'$ is located with a certain clearance in a bore in the corresponding projection 1", in which hole it is anchored, in axial direction, by an enlarged rear portion preferably consisting of a few loops $a''$ of the same wire, coiled in the opposite direction over the corresponding end of the spring $a'$. The glass 5 is connected to the spring $a'$ by threading the screw 6 directly into the spring $a'$, whose coils constitute the outer thread for the screwthread 6. By screwing up the screw 6, the spring $a'$ is loaded and, since it is anchored with its enlarged portion $a'$ inside the hole which serves as its seat, the glass 5 is drawn to bear elastically against the frame. This connection of the element 5 to the frame is not rigid but resilient so as to allow said element to yield, slightly, without breaking if subjected to excessive stress. In order to eliminate the possibility of rotating of lens 5 about the axis of screw 6, projections 7 are provided on bridge 1' and at the end of projection 1" against which the glass 5 abuts with its edge.

The preferred embodiment shown in Fig. 3 may be modified. As shown in Fig. 4, the spring $a'$ may be retained in the seat provided in projection 1", by using a second screw 6' threaded into the opposite end of the spring. Spring $a'$ may also be replaced, as in the embodiment shown in Fig. 5, by a rubber cylinder 8 mounted on a socket 9, having a retaining head 9', into which the screw 6 may be threaded. The cylinder 8 may also be replaced by a helical wire spring 10 as in the embodiment shown in Fig. 6.

I claim:

1. An ophthalmic mounting comprising a frame portion having an opening formed therein; an extensible resilient member anchored at its posterior end within said opening; a lens for attachment in abutting relation against the side of said frame portion opposite the anchored end of said resilient member; and a fastening member extending through an opening in said lens and detachably engageable with the anterior end of said resilient member for placing said resilient member under axial tension and resiliently retaining said lens against said frame portion.

2. An ophthalmic mounting comprising a frame portion having an opening formed therein; an extensible resilient unitary member anchored at its posterior end within said opening; said opening being formed with an abutment shoulder adjacent the posterior end thereof and said resilient member being formed with a terminal enlargement for engagement against said abutment shoulder; a lens for attachment in abutting relation against the side of said frame portion opposite the anchored end of said resilient member; and a fastening member extending through an opening in said lens and detachably engageable with the anterior end of said resilient member for placing said resilient member under axial tension and resiliently retaining said lens against said frame portion.

3. An ophthalmic mounting comprising a frame portion having an opening formed therein; a helical coil spring anchored at its posterior end within said opening; a lens for attachment in abutting relation against the side of said frame portion opposite the anchored end of said coil spring; and a screw extending through an opening in said lens and detachably engageable within the anterior end of said coil spring for placing said coil spring under axial tension and resiliently retaining said lens against said frame portion.

4. An ophthalmic mounting comprising a frame portion having an opening formed therein; a helical coil spring anchored at its posterior end within said opening; said opening being formed with an abutment shoulder adjacent the posterior end thereof and said coil spring being formed with a terminal enlargement for engagement against said abutment shoulder; a lens for attachment in abutting relation against the side of said frame portion opposite the anchored end of said coil spring; and a screw extending through an opening in said lens and detachably engageable within the anterior end of said coil spring for placing said coil spring under axial tension and resiliently retaining said lens against said frame portion.

5. An ophthalmic mounting in accordance with claim 4 wherein the terminal enlargement of said coil spring comprises additional convolutions of the spring continuous with and superposed over the main body portion of said spring.

ANTONIO SANTA.

REFERENCES CITED

The following references are of record in the file of this patent:

UNITED STATES PATENTS

| Number | Name | Date |
|---|---|---|
| 683,176 | Ho-Glen | Sept. 24, 1901 |
| 739,439 | Nourie | Sept. 22, 1903 |
| 907,764 | Fay | Dec. 29, 1908 |
| 958,485 | Fay | May 17, 1910 |
| 1,072,159 | Pfeiffer | Sept. 2, 1913 |
| 1,161,699 | Loughlin | Nov. 23, 1915 |
| 1,290,419 | Uhlemann | Jan. 7, 1919 |
| 1,918,998 | Wells | July 18, 1933 |
| 2,011,905 | Pappert | Aug. 20, 1935 |
| 2,389,116 | Aspenleiter | Nov. 20, 1945 |